US009072328B2

(12) United States Patent
Rogers et al.

(10) Patent No.: US 9,072,328 B2
(45) Date of Patent: *Jul. 7, 2015

(54) HINGED ATTACHMENT OF HEADGEAR TO A HELMET

(75) Inventors: David Charles Rogers, Boston, MA (US); Charles H. Rogers, Halifax, MA (US); Darwin Keith-Lucas, Boston, MA (US)

(73) Assignee: ARTISENT, LLC, Simpson, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/224,559

(22) Filed: Sep. 2, 2011

(65) Prior Publication Data

US 2011/0314594 A1    Dec. 29, 2011

Related U.S. Application Data

(63) Continuation of application No. 11/760,412, filed on Jun. 8, 2007, now Pat. No. 8,028,344, which is a continuation-in-part of application No. 11/350,591, filed on Feb. 9, 2006, now Pat. No. 7,908,667.

(60) Provisional application No. 60/691,307, filed on Jun. 17, 2005, provisional application No. 60/811,896, filed on Jun. 8, 2006.

(51) Int. Cl.
*A42B 1/24* (2006.01)
*A42B 3/04* (2006.01)
*G02B 23/12* (2006.01)

(52) U.S. Cl.
CPC .............. *A42B 3/0406* (2013.01); *A42B 3/04* (2013.01); *G02B 23/12* (2013.01)

(58) Field of Classification Search
CPC .......... A42B 3/0406; A42B 3/04; A42B 3/16; A42B 3/08; A42B 3/00
USPC ............................... 2/6.2, 422, 421, 423, 410
See application file for complete search history.

(56) References Cited

U.S. PATENT DOCUMENTS

| 3,187,342 | A | * | 6/1965 | Aileo | ................. 2/421 |
|---|---|---|---|---|---|
| 3,430,261 | A | * | 3/1969 | Benner | ............................. 2/423 |
| 3,461,463 | A | | 8/1969 | Beguin | |
| 3,795,919 | A | | 3/1974 | Aho et al. | |
| 3,845,505 | A | | 11/1974 | Davison et al. | |
| 3,864,756 | A | | 2/1975 | Desimone | |
| 3,946,466 | A | | 3/1976 | Sakai et al. | |
| 4,027,341 | A | | 6/1977 | Patteri et al. | |
| 4,069,512 | A | | 1/1978 | Palmaer et al. | |
| 4,104,743 | A | | 8/1978 | Bottger et al. | |
| 4,222,123 | A | | 9/1980 | Hellberg | |
| 4,224,694 | A | | 9/1980 | Palmaer | |

(Continued)

FOREIGN PATENT DOCUMENTS

KP    20-2003-0039       3/2004
KR    20-2003-0039621    3/2004

*Primary Examiner* — Shaun R Hurley
*Assistant Examiner* — Andrew W Sutton
(74) *Attorney, Agent, or Firm* — Morgan, Lewis & Bockius LLP

(57) ABSTRACT

A hinge mechanism for attaching ear accessories to a helmet allows an accessory to be attached at a point outside the helmet shell utilizing, for example, a slidable mounting rail, and to reach under the edge of the helmet shell so that the accessory is supported in contact with the wearer's head. The hinge mechanism is well suited for use in connection with military helmets that have a "bulge" or protrusion over the ear.

22 Claims, 20 Drawing Sheets

(56) References Cited

U.S. PATENT DOCUMENTS

| | | | |
|---|---|---|---|
| 4,316,290 A | 2/1982 | Montesi | |
| 4,347,631 A | 9/1982 | Newcomb | |
| 4,521,831 A | 6/1985 | Thayer | |
| 4,639,950 A | 2/1987 | Palmaer | |
| 4,692,947 A * | 9/1987 | Black et al. | 2/421 |
| 4,788,724 A | 12/1988 | Lazzeroni et al. | |
| 4,944,361 A | 7/1990 | Lindgren et al. | |
| 5,068,923 A | 12/1991 | Sjoqvist | |
| 5,133,596 A | 7/1992 | Korny et al. | |
| 5,371,905 A | 12/1994 | Keim | |
| 5,621,923 A * | 4/1997 | Tapocik | 2/422 |
| 5,790,681 A | 8/1998 | Leppalahti | |
| 5,907,868 A * | 6/1999 | Schleger et al. | 2/10 |
| 5,978,973 A | 11/1999 | Chartrand | |
| 6,009,561 A | 1/2000 | Bullock et al. | |
| 6,009,562 A | 1/2000 | Bullock et al. | |
| 6,115,846 A | 9/2000 | Truesdale | |
| 6,283,620 B1 | 9/2001 | Taylor et al. | |
| 6,389,606 B1 | 5/2002 | Galet et al. | |
| 6,472,776 B1 | 10/2002 | Soto et al. | |
| 6,662,370 B1 | 12/2003 | Buchanan, Jr. | |
| 6,751,810 B1 | 6/2004 | Prendergast | |
| 6,754,361 B1 | 6/2004 | Hall et al. | |
| 6,754,911 B1 | 6/2004 | Howell | |
| 7,849,517 B2 | 12/2010 | Rogers et al. | |
| 8,028,344 B2 * | 10/2011 | Rogers et al. | 2/6.2 |
| 2004/0143888 A1 | 7/2004 | Bataille et al. | |
| 2004/0194194 A1 | 10/2004 | McNeil et al. | |
| 2005/0132461 A1 | 6/2005 | Koo | |
| 2006/0282939 A1 | 12/2006 | Rogers et al. | |
| 2007/0226865 A1 | 10/2007 | Lindgren | |
| 2008/0092278 A1 | 4/2008 | Rogers et al. | |
| 2008/0184465 A1 | 8/2008 | Chang | |

* cited by examiner

HINGED ATTACHMENT OF HEADGEAR TO A HELMET

RELATED APPLICATIONS

The present application is continuation of U.S. Ser. No. 11/760,412, filed on Jun. 8, 2007, now U.S. Pat. No. 8,028,344, which is a continuation-in-part of U.S. Ser. No. 11/350,591, filed on Feb. 9, 2006, now U.S. Pat. No. 7,908,667, which claims priority to, and the benefits of, U.S. Ser. No. 60/691,307, filed Jun. 17, 2005; U.S. Ser. No. 11/760,412, now U.S. Pat. No. 8,028,344, also claims priority to U.S. Ser. No. 60/811,896, filed on Jun. 8, 2006. The entire disclosures of these applications are hereby incorporated by reference.

FIELD OF THE INVENTION

This invention relates to safety helmets, and in particular to attachment of accessories that may be optionally mounted onto the helmet.

BACKGROUND OF THE INVENTION

Helmets for head protection are worn in a variety of environments and for various purposes. Accessories may be added to the helmet according to the needs of the wearer and the demands of the use environment. Such accessories may, for example, provide additional protection, as in the case of a face shield; additional capability such as night vision; or communication in the case of earpieces.

Ear accessories (e.g., communications devices integrated within a padded earphone) can be critical in numerous helmet deployments; for example, the need for both protection and communication is particularly important in military, firefighter, rescue and similar activities. The prior art includes two approaches: ear accessories built into the helmet, and ear accessories worn separately beneath the helmet. An example of a helmet with built-in earphones is the present military helmet known as the Combat Vehicle Crew (CVC) helmet. Unfortunately, because the earphones add weight and do not function in dismounted operations, and cannot be removed, the vehicle crew members are issued two helmets—the CVC helmet and a standard infantry helmet.

The Modular Integrated Communications Helmet (MICH) supports earphones worn beneath the helmet. The earphones are donned first and the helmet, in use, rests on the wearer's head atop the earphone headband. To accommodate the space required for the earphone headband, the pads within the MICH helmet are removed or repositioned according to the wearer's head shape and size. In some cases this repositioning results in improper fit and/or less protection in the case of impact. Wearers may also experience discomfort due to the extra layer of retention elements separately holding the earphones and the helmet.

SUMMARY OF THE INVENTION

The present invention provides a hinge mechanism for attaching ear accessories to a helmet. The hinge mechanism allows an ear accessory to be attached at a point outside the helmet shell utilizing, for example, a slidable mounting rail, and to reach under the edge of the helmet shell so that the accessory is supported in contact with the wearer's head. The hinge mechanism of the present invention is well suited for use in connection with military helmets that have a "bulge" or protrusion over the ear.

In some embodiments, a pivot arm of the hinge mechanism allows the ear accessory to extend below the edge of the helmet and, alternatively, to fold into a lower-profile configuration for stowage. The pivot arm may include a split ring that facilitates attachment to the posts of standard earphones. In particular, by removing a screw and separating the split ring into two parts, it may be placed around the posts of standard earphones, and secured by reinserting and tightening the screw. By replacing the existing ear-accessory support with the pivot arm of the present hinge mechanism, ear accessories that have already been fielded can be retrofitted in accordance herewith. The pivot arm desirably also provides clearance for any wires exiting the ear accessory and, depending on the application, clearance to access a battery compartment of the accessory.

The overall length of the pivot arm is selected to facilitate positioning and removal of the ear accessory around the edge of the helmet shell. The length from center of the pivot point where the pivot arm joins the connecting member and the center of the split ring may be, for example, between 0.5 inch and 2 inches (e.g., 1.25 inches). The pivot arm may include features that facilitate adjustment of the pressure placed by the ear accessory on the wearer's ear.

In some embodiments, a connecting member is pivotably connected to the pivot arm and slidably joined to a shoulder member, thereby forming an attachment assembly. The pivot arm and connecting member joined together may also be optionally attached to a conventional headband (instead of joining the shoulder member) to support the ear accessory without the helmet. The slidable connection between the connecting member and shoulder member provides adjustment of the ear accessory in height to obtain a comfortable position over the wearer's ear.

A shoulder member may support connection of the hinge mechanism to the helmet, for example, using the slidable mounting rail described below (it being understood that alternative means for attaching the shoulder member to the helmet may be substituted without detracting from the benefits of the present invention). The shoulder member of the hinge mechanism may also provide rotation to allow the ear accessory to rotate to the back of the helmet, facilitating stowage when the accessory is not needed.

A preferred mounting platform (herein referred to as a "mounting rail") accepts the ear-accessory hinge mechanism and, if desired, additional accessories at desired locations and with positional security. The mounting rail may have slides, threaded holes, or other mounting fixtures suited to securing the accessories. The mounting rail may be configured to present a relatively low-profile protrusion from the helmet using physical surfaces that offer low risk of snagging or being caught in external devices when accessories are not in place. The mounting rail allows for adjustment of the position of the accessories when they are attached to the rail, which desirably accepts more than one optional accessory.

The mounting rail utilizes an interface structure secured to the outer shell of the helmet, providing surfaces for mounting accessories onto the mounting rail instead of directly onto the helmet. In some embodiments, the mounting rail may be secured to the helmet shell using existing through-holes in the helmet shell and the fasteners already employed in connection with helmet-retention components such as straps or headbands. The fasteners may be, for example, rivets or nuts and bolts and may be made from plastic (for light-duty applications), stainless steel, or forge-hardened steel (for helmets providing ballistic protection).

A preferred embodiment of the mounting rail comprises a molded component conforming to the shape of the outer shell of the helmet. In some versions, the bottom edge of the rail fixture (which itself includes one or more rails) conforms to the bottom edge of the helmet, while in other versions, the entire fixture is raised on the side of the helmet, residing, for example, over (and conforming to at least a portion of) a bulge or other protrusion or discontinuity in the helmet. The rail fixture desirably spans a sufficient circumference of the helmet shell to overlap at least two existing through-holes provided for securing retention components thereto. The mounting rail may then be secured to the helmet shell by sharing fasteners with the retention components using these through-holes. A benefit of this embodiment is that the mounting rail can be added to already-manufactured helmets by providing the appropriate mounting rail with mounting holes at the dimensions of the existing through-holes in the helmet. If necessary, modified fasteners, which may be longer than the standard fasteners, can be provided to secure both the mounting rail and the existing retention components using the existing through-holes. Avoiding the need for additional through-holes to secure the mounting rail means that the safety features of the shell are not altered. It should be stressed, however, that the use of existing through-holes is by no means necessary. Other approaches such as co-molding or thermo-bonding with the shell, bonding using adhesives, or a combination of adhesives and one or more fasteners can be used to secure the mounting rail to the helmet shell (or to fabricate it integrally therewith).

As used herein, the term "rail" refers to a mounting facility with parallel boundaries, and which slidably accepts a complementary engagement member. The preferred embodiment of the mounting rail includes a recessed groove open on at least one end and preferably on both ends. Accessories having an engagement member complementary to the recessed groove may be attached to the mounting rail by sliding the engagement member into the mounting-rail groove and securing it in place. The preferred cross-sectional profile for the groove is flat on the surface toward the helmet with angular side walls; this configuration is sometimes referred to as a dove-tail recessed groove. The opening width of the groove may range from 0.25 to 1.0 inch (and is preferably 0.75 inch) with walls angled inward from 30° to 60° (and preferably at 45°). The dovetail shape retains the attaching component by means of the angled walls, but the profile may be any suitably retentive shape (such as an "L" or "T" shape) having edges that slidably retain an attaching component, allowing it to reach a desired position where it is secured into place. Means for securing the position of the mounting element are well known in the art and may include, for example, a "thumbscrew" tightener or a "tab-and-slot" engagement mechanism.

Accordingly, in a first aspect, the invention relates to a mounting facility for a safety helmet of the type having a bulge or protrusion on a side thereof to form a cavity therein, where the cavity extends to a terminal edge of the helmet and overlies a wearer's ear. The mounting facility comprises a fixture configured for attachment to the helmet above the bulge and, attached to the fixture, an articulating arm assembly for receiving an ear accessory. The arm assembly facilitates insertion of the ear accessory into the cavity and its removal therefrom around the terminal edge.

In some embodiments, the articulating arm assembly includes a joint mechanism facilitating rotational downward and inward movement of the ear accessory relative to the terminal edge. The joint mechanism may comprise first and second hinges, and the articulating arm assembly may comprise a flexible member that resists outward movement of the ear accessory relative to the wearer's head, thereby holding the ear accessory in contact with the wearer's head. The articulating arm assembly may also comprise means for adjusting a distance between the ear accessory and the terminal edge of the helmet. The mounting facility may further comprise means facilitating rotation of the articulating arm to place the ear accessory behind the helmet and/or means for adjustably limiting rotation of at least one of the hinges.

In a second aspect, the invention relates to an articulating arm assembly for use with a safety helmet of the type that has a bulge or protrusion on a side thereof to form a cavity therein, where the cavity extends to a terminal edge of the helmet and overlies a wearer's ear. The arm assembly comprises means for engaging an ear accessory and means facilitating insertion of the ear accessory into the cavity and its removal therefrom over the terminal edge. The articulating arm assembly may comprise a flexible member that resists outward movement of the ear accessory relative to the wearer's head, thereby holding the ear accessory in contact with the wearer's head, and/or means for adjusting a distance between the ear accessory and the terminal edge of the helmet.

In a third aspect, the invention relates to a safety helmet comprising a bulge or protrusion on a side thereof to form a cavity therein, the cavity extending to a terminal edge of the helmet and overlying a wearer's ear, a fixture attached to the helmet above the bulge and, attached to the fixture, an articulating arm assembly for receiving an ear accessory. The arm assembly facilitates insertion of the ear accessory into the cavity and its removal therefrom over the terminal edge. The helmet may include other features as described above.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

For ease of presentation, the present discussion focuses first on a suitable mounting rail to which a hinged ear-accessory retention system may be mounted; preferred embodiments of the ear-accessory retention system itself are then described.

Mounting Rail

Figure 1A:
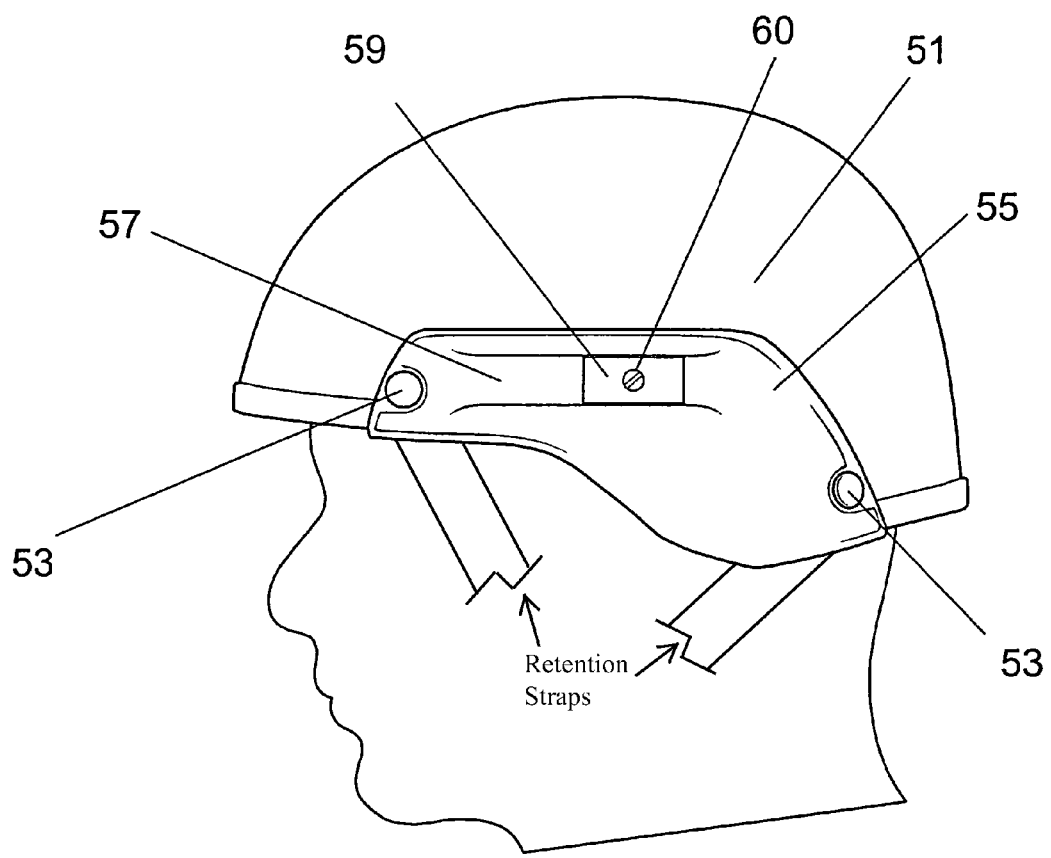
FIG. 1a shows the left side of a helmet having a mounting rail.

With reference to FIG. 1a, a helmet shell 51 is shown from the left side of the user's head (the right side having symmetrical features). A mounting rail 55 is included within a fixture preferably fabricated from nylon, polypropylene, or other synthetic plastic using injection molding processes, the bottom edge of which conforms to the bottom edge of the helmet shell 51. The fixture is secured to the exterior of helmet shell 51 by means of fasteners 53 in the front and back. In another embodiment, illustrated in FIG. 1b, mounting rail 55 is included within a fixture having a bottom edge that conforms to a convex extension 56 of helmet shell 51.

Figure 1B:
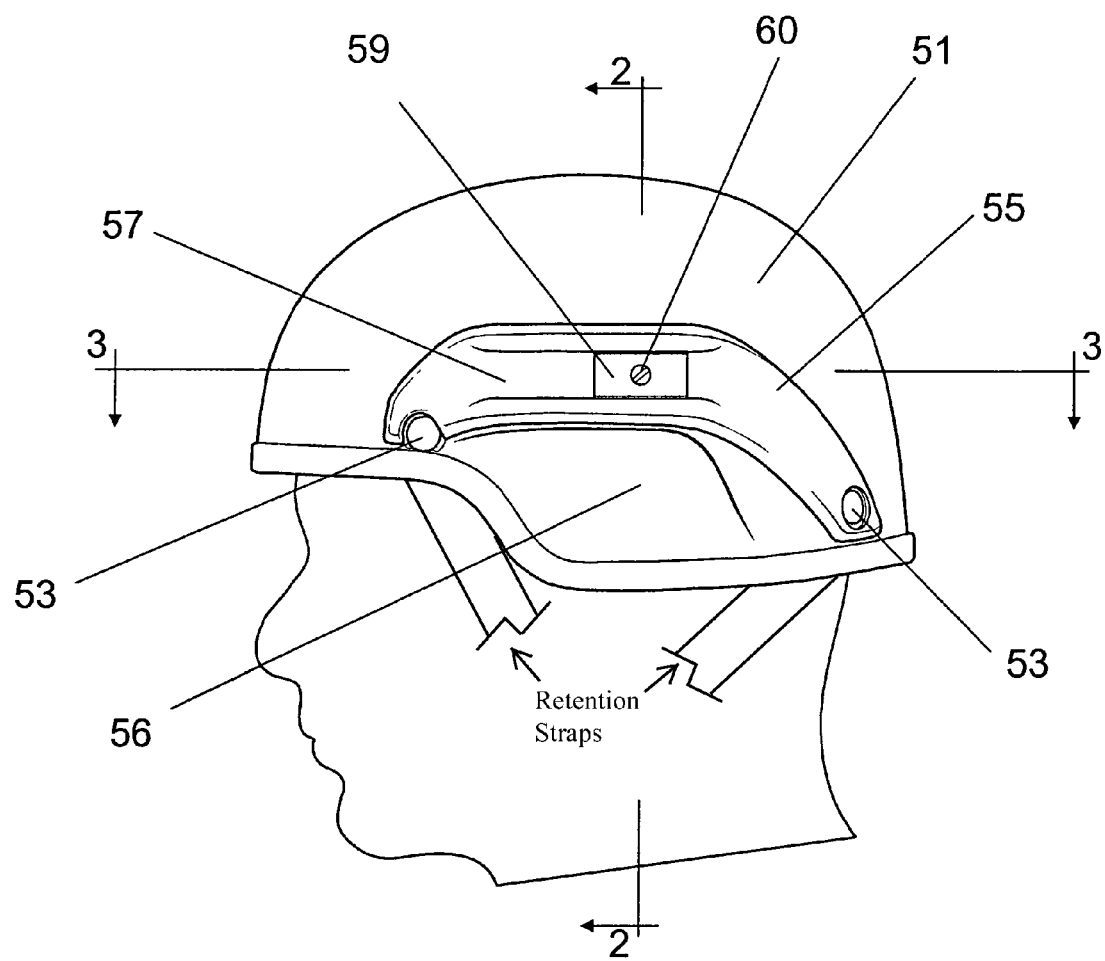
FIG. 1b shows the left side of a helmet having an alternate mounting rail.

A recessed groove 57 in the mounting rail 55 slidably accepts a complementary engagement member 59 of a potential accessory, which may be secured by tightening a securing member 60 (e.g., a standard screw, as illustrated, or a thumb-screw, tab-and-slot system, or other suitable engagement mechanism). The engagement member 59 shown in FIGS. 1a and 1b is illustrative only; in practice, it would carry a functional accessory. Virtually any accessory suitable for mounting to the helmet 51 can be designed to have an engagement member complementary to the recessed groove 57.

Figure 2:
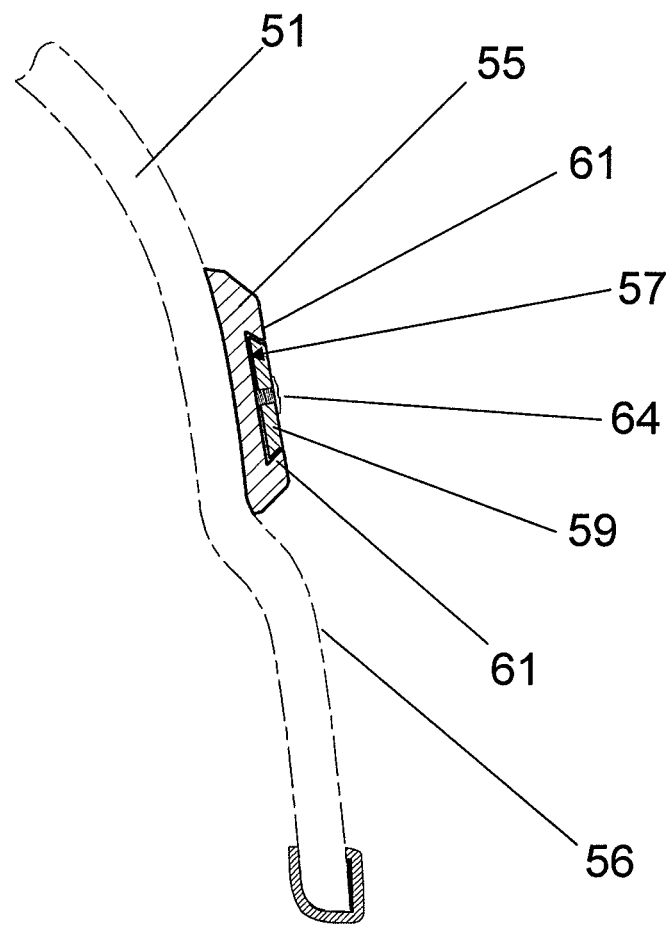
FIG. 2 is a cross-section of the mounting rail shown in FIG. 1b taken along the section 2-2.

In FIG. 2 the mounting rail 55 is shown in cross-section, mounted on helmet shell 51. In the illustrated embodiment, the cross-sectional profile of the recessed groove 57 is a dove-tail configuration complementary in cross-section to that of an attaching component 59. The dovetail shape retains the attaching component 59 by means of the angled edges 61, but allows it to slide within the recessed groove 57 to reach a desired position where it is further secured by a tightening screw 64. The ends of the mounting rail 55 desirably slope toward the surface of the helmet shell 51.

Figure 3A:
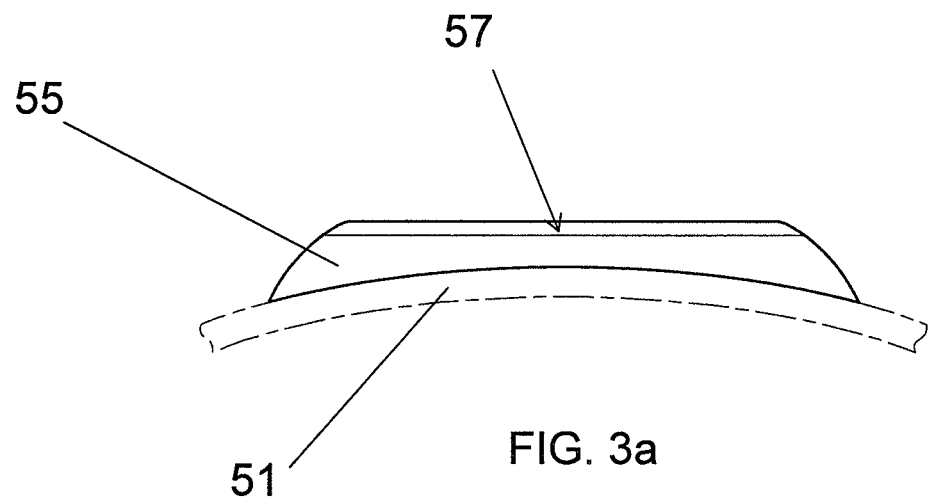
FIG. 3a is a cross-section of the mounting rail shown in FIG. 1b taken along the section 3-3.

As shown in FIG. 3a, the mounting rail 55 provides a geometrical interface between the curving surface of the helmet shell 51 and a straight groove 57. A straight groove 57 is beneficial because it allows attaching component 59 to be formed with simple flat surfaces while still allowing adjustment of the position of the accessory along the length of the groove 57.

Figure 3B:
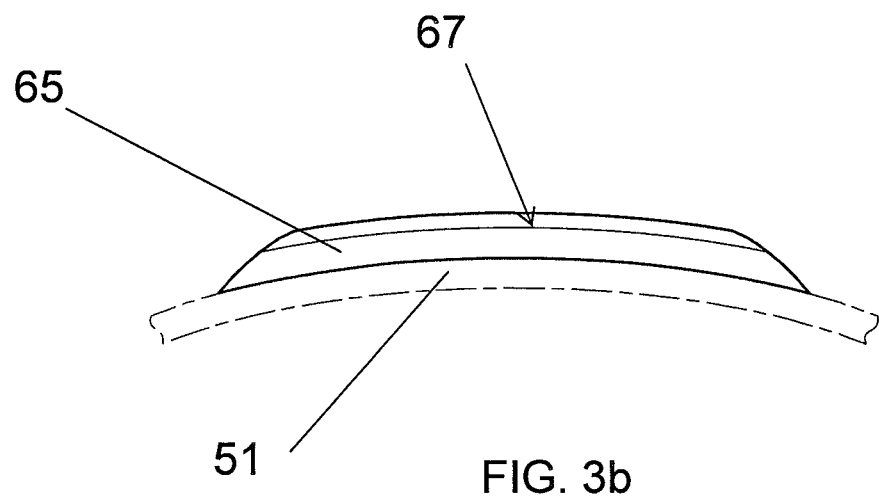
FIG. 3b is a cross-section similar to FIG. 3a showing an alternative form of the mounting rail of FIG. 1b.

On the other hand, as shown in FIG. 3b, another embodiment of the mounting rail utilizes a non-straight recessed groove 67. The inner surface of the mounting rail 65 has a contour that conforms to the helmet shell 51, and the recessed groove 67 also approximates the curved surface of the helmet shell 51 but with a constant radius. The curved groove 67 has the benefit of reducing the protrusion at the ends of the mounting rail 55 shown in FIG. 3a. If the recessed groove 67 has a constant radius, the attaching component 59 can have a matching curved shape and still freely slide within the groove 67. The mounting rail 65 provides an interface between differently sized helmets having different amounts of curvature and a groove 67 with a common constant radius (independent of the size and curvature of the helmet). For accessories that do not require the flat surface as shown in FIG. 3a, and thus the lower profile of mounting rail 65 shown in FIG. 3b, a curved mounting rail may be preferred.

Figure 4A:
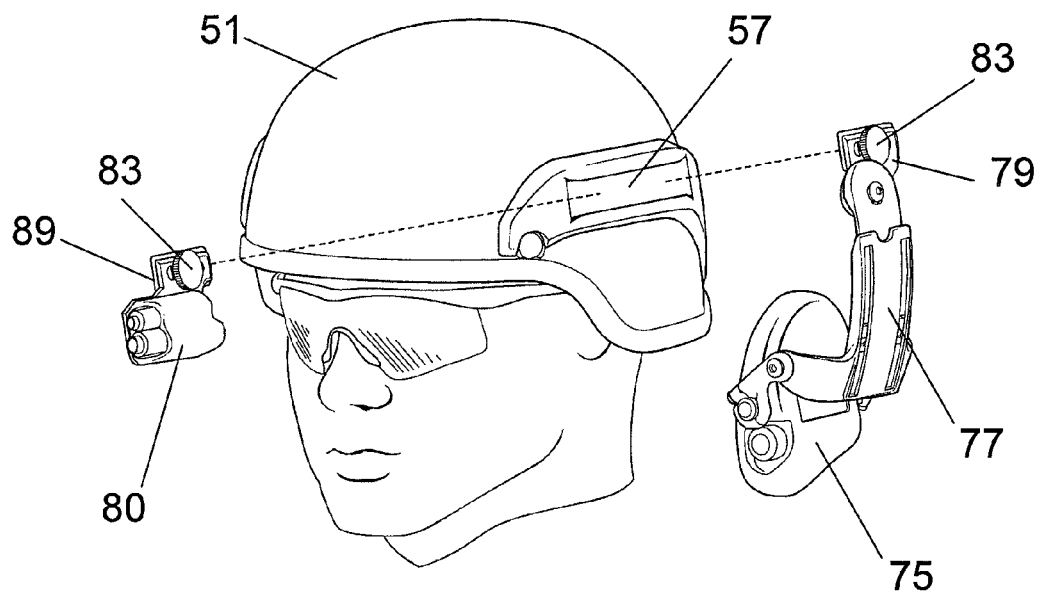
FIG. 4a shows the mounting rail of FIG. 1b with two accessories positioned to be attached.
Figure 4B:
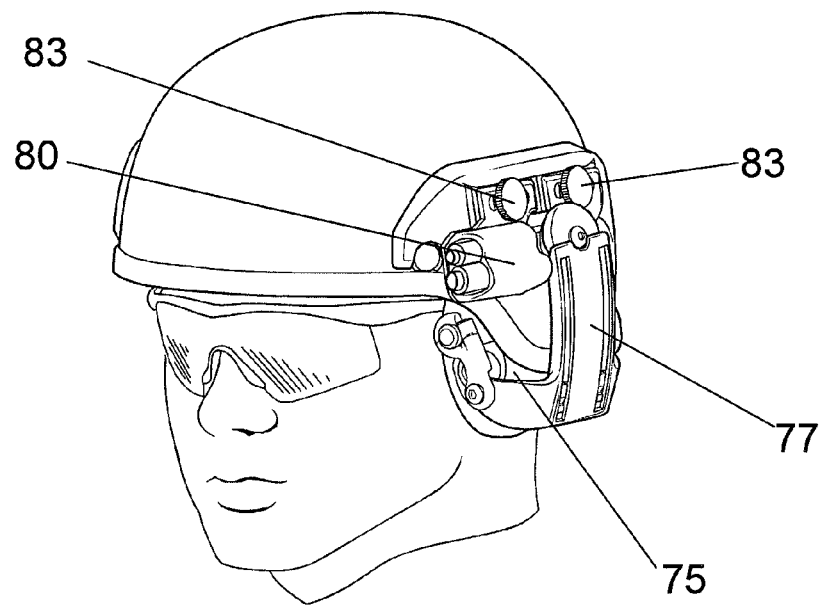
FIG. 4b shows the mounting rail of FIG. 4a with the two accessories mounted in place.

FIG. 4a shows the mounting rail of FIG. 1 mounted on helmet shell 51 with two accessories 75 and 80 positioned to be attached. The earphone accessory 75 is described below; a similar earphone can be mounted on the right side of the helmet in a symmetrical mounting rail (not shown). As described below in connection with FIG. 8C, the earphone 75 is attached by a connecting member 77 to the engagement member 79, which can itself be positioned along recessed groove 57 by sliding engagement member 79 therealong and securing it with the thumbscrew 83. Accessory 80 is an illuminator that can be similarly attached by sliding the engagement member 89 within recessed groove 57 and securing it with thumbscrew 83. FIG. 4b shows the mounting rail of FIG. 4a with the two accessories 75, 80 mounted in place.

Figure 5:
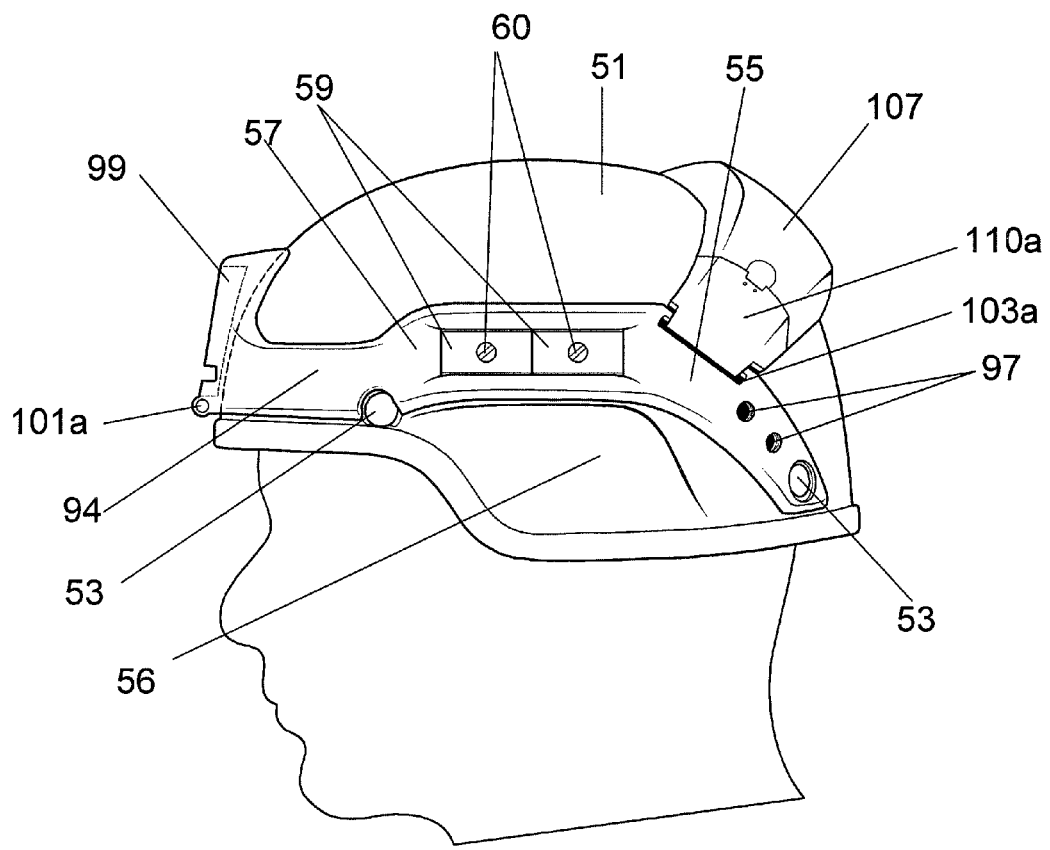
FIG. 5 shows another embodiment of the present invention having additional means of attaching accessories to a first mounting rail.

FIG. 5 shows another mounting rail affixed to a helmet shell 51. In this embodiment the mounting rail 55 on the left side of the helmet (shown) is extended forward by a front connecting element 94, which joins with the mounting rail 55 on the right side of the helmet (not shown). The entire mounting rail thus encircles three-quarters of the helmet shell 51 and is secured by means of five fasteners 53, two on each side and one in the front, which desirably penetrate the shell using the through-holes shared with retention components (not shown). This embodiment may comprise additional attaching features, it being understood that any particular version may have some, but not necessarily all of the attaching features illustrated. In addition to the recessed groove 57 already described, this embodiment has one or more threaded holes 97, which serve as mounting points for an accessory that can be threadably mounted therein. An attachment surface 99 on the front connecting element 94 accepts accessories such as PVS-14 night vision goggles to the front of the helmet. A hole 101a on the left side of the front connecting element 94 can be used in conjunction with a similar hole 101b on the right side to provide a hinged mounting point in the front for an additional accessory (see FIG. 6). Finally, a slot 103 allows a rear connecting element 107 to be attached as further described in connection with FIG. 7.

Figure 6:
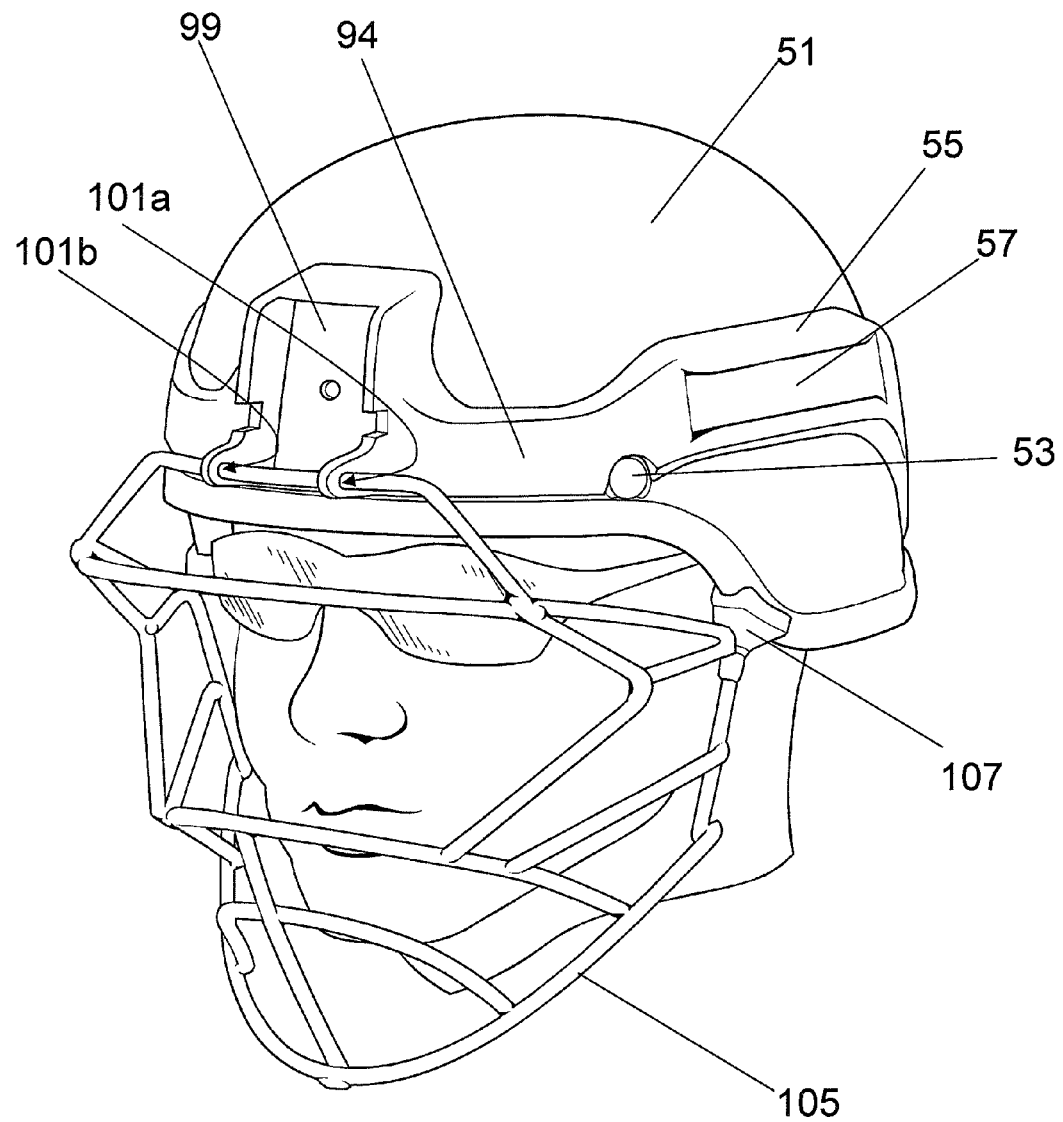
FIG. 6 shows a perspective view of the mounting rail of FIG. 5 with an accessory mounted to the front.

FIG. 6 shows a face-protection accessory 105 hingeably affixed to the mounting rail of the present invention using holes 101a and 101b. The face-protection accessory 105 may be further supported by a bumper 107 that braces against the helmet shell 51. Mounting holes 101a, 100b provide a secure, hinged attachment to the helmet, allowing the face-protection accessory 105 to be hinged upward and out of the way when not needed.

Figure 7:
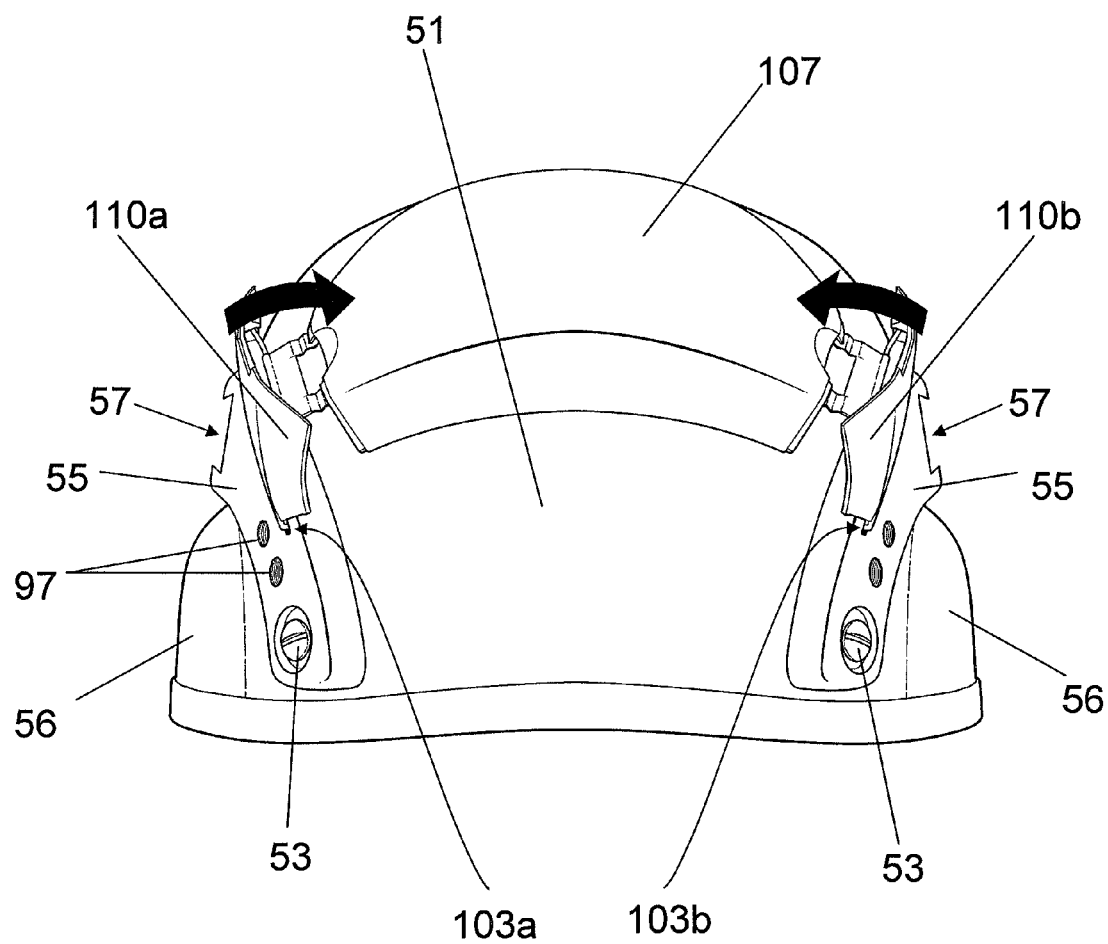
FIG. 7 is a view from the back of the helmet of FIG. 5 showing an additional element for containing and/or supporting accessories.

With reference to FIGS. 5 and 7, a rear connecting element 107 is designed to mate with slot 103a in mounting rail 55 on the left side and to extend around the back of the helmet shell 51 to a similar slot 103b on the mounting rail on the right side of the helmet. The rear connecting element 107 is desirably slightly compliant and conformal with the outer shell 51 such that when a tension is established between the two slots 103a and 103b, the rear connecting element 107 comes into close contact with the shell 51. This rear connecting element 107, which creates a bridge under tension between left-side and right-side mounting rails, allows the rails to better resist dislodgement by horizontal or rotational forces. The tension may be established by a pair of over-the-center latches 110a, 110b, which have ends adapted to fit into slots 103a, 103b, respectively, and to move hingeably downward (as indicated by the arrows) so as to snap against connecting element 107. Alternatively, tension can be provided by other suitable means known in the art such as tightening screws that pull two parts of the rear connecting element 107 together to contract its length. Accessories may be attached externally to the rear connecting element 107 using any of the attaching features as described above in connection with FIG. 5. Alternatively, rear connecting element 107 can provide a protected space for smaller accessories, such as electronic components, which can be stored within the space within the rear connecting element 107 or between it and the outer shell 51.

Ear-Accessory Retention System

Figure 8A:
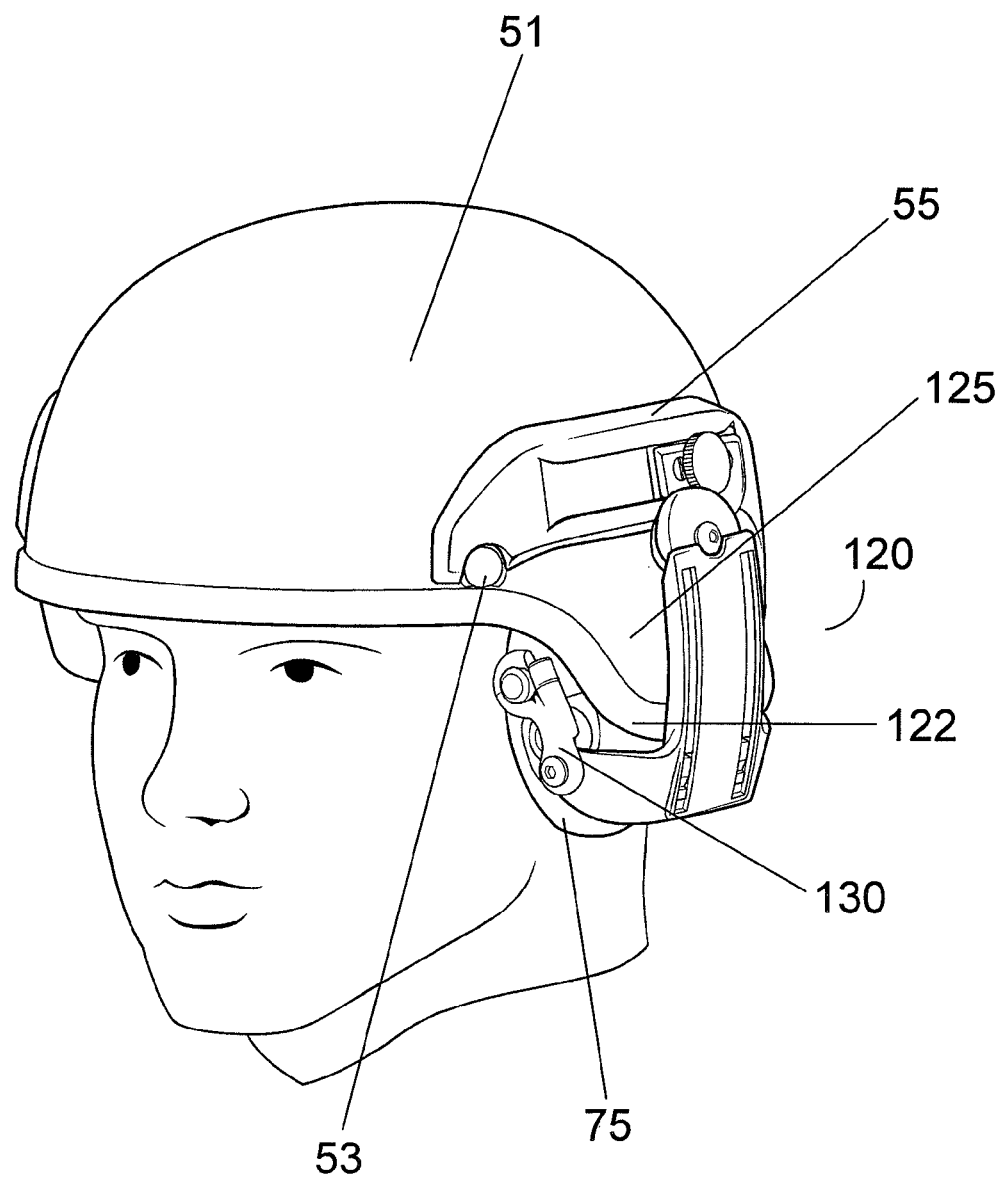
FIG. 8A shows the left side of a helmet incorporating an embodiment of the hinged ear-accessory mechanism of the present invention, with an earphone attached to the helmet and positioned over the wearer's ears for normal use.
Figure 8B:
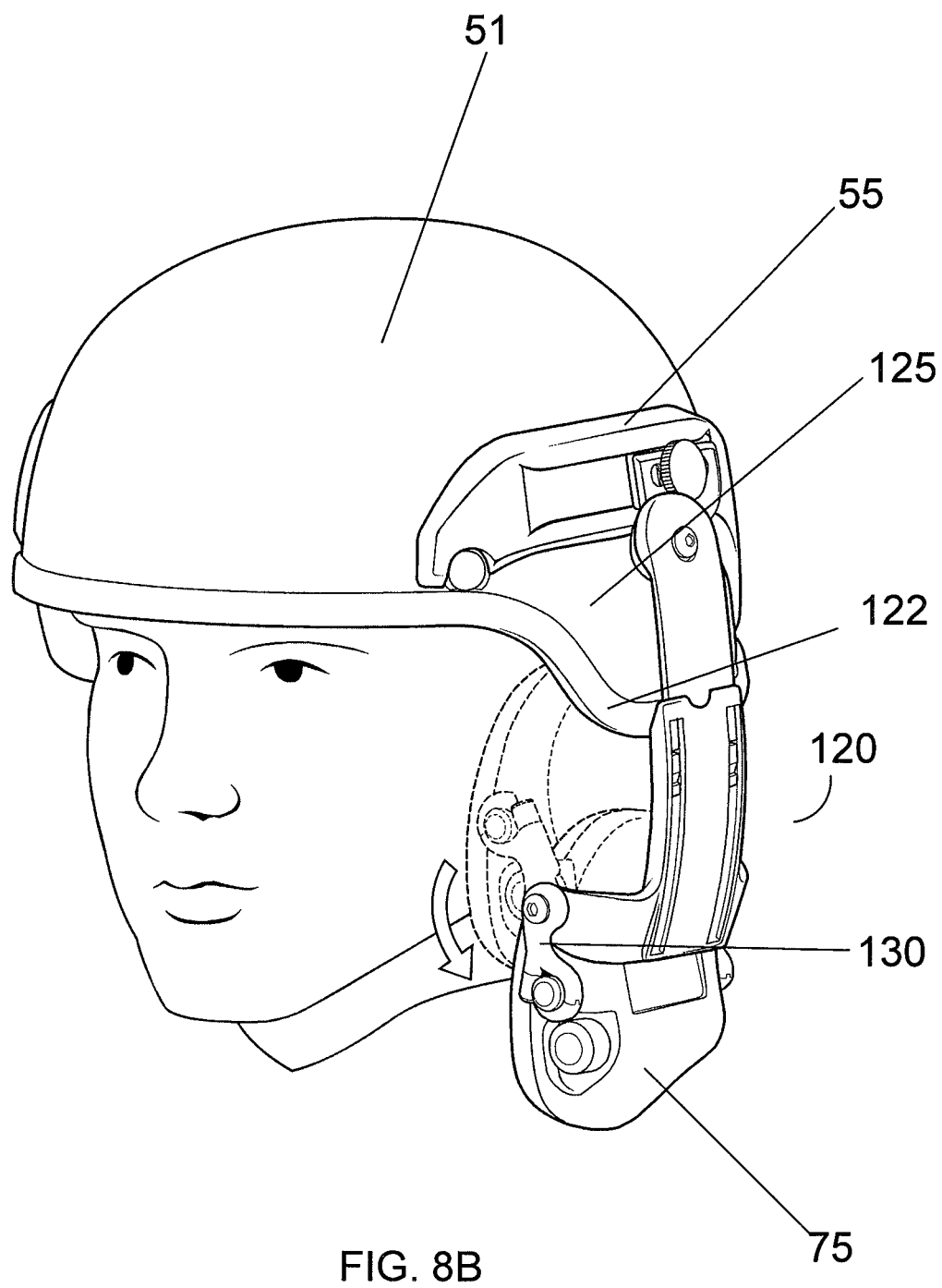
FIG. 8B shows the helmet of FIG. 8A with the hinge mechanism and earphone assembly moved downward to an intermediate position.
Figure 8C:
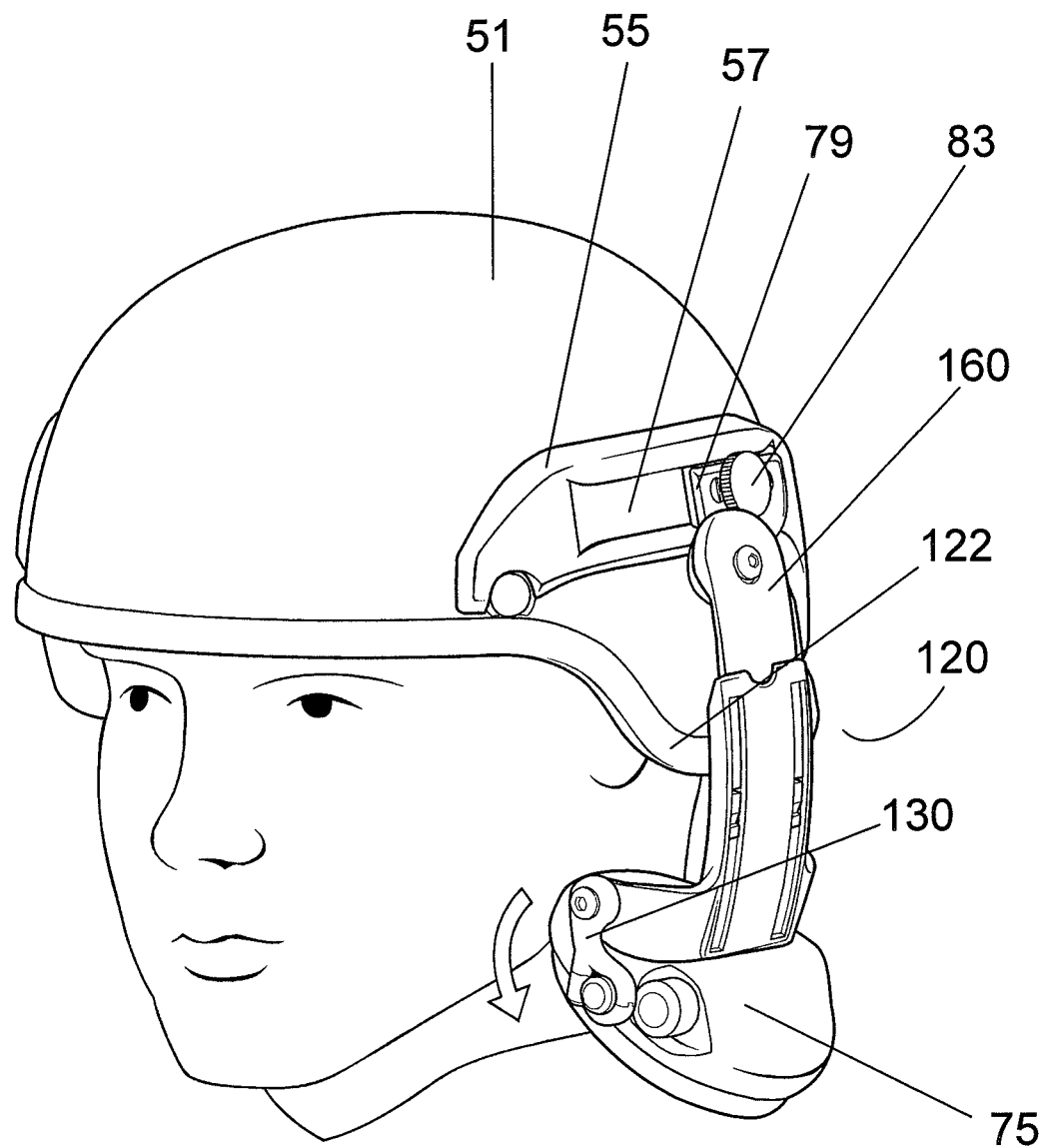
FIG. 8C shows the hinge mechanism and earphone assembly moved fully downward and outward prior to removing or stowing the earphone.

The general operation of an ear-accessory retention system in accordance with the present invention is shown in FIGS. 8A-8C. FIG. 8A shows the left side of a helmet shell 51, the right side having symmetrical features and requirements. A hinge mechanism in accordance with the present invention, generally indicated at 120, is attached to a mounting rail 55, which is itself attached to the helmet shell 51 by means of fastener 53. The hinge mechanism 120 supports an ear accessory (specifically, in the illustration, an earphone) 75, and allows the earphone 75 to extend below the terminal edge 122 of the helmet 51. It also allows the earphone 75 to fit against the wearer's ear with the cavity formed by the protrusion or bulge 125 of the helmet 51.

FIG. 8B shows the hinge mechanism 120 in an intermediate position, as may be the case when the wearer is engaging or removing the earphone 75. Pulling the earphone 75 causes a pivot arm 130 to rotate as the earphone slides downward away from the wearer's ear. With the pivot arm 130 fully rotated to a downward position, the earphone 75 can pass out of the cavity and beneath the edge 122 of the helmet shell 51.

Figure 8D:
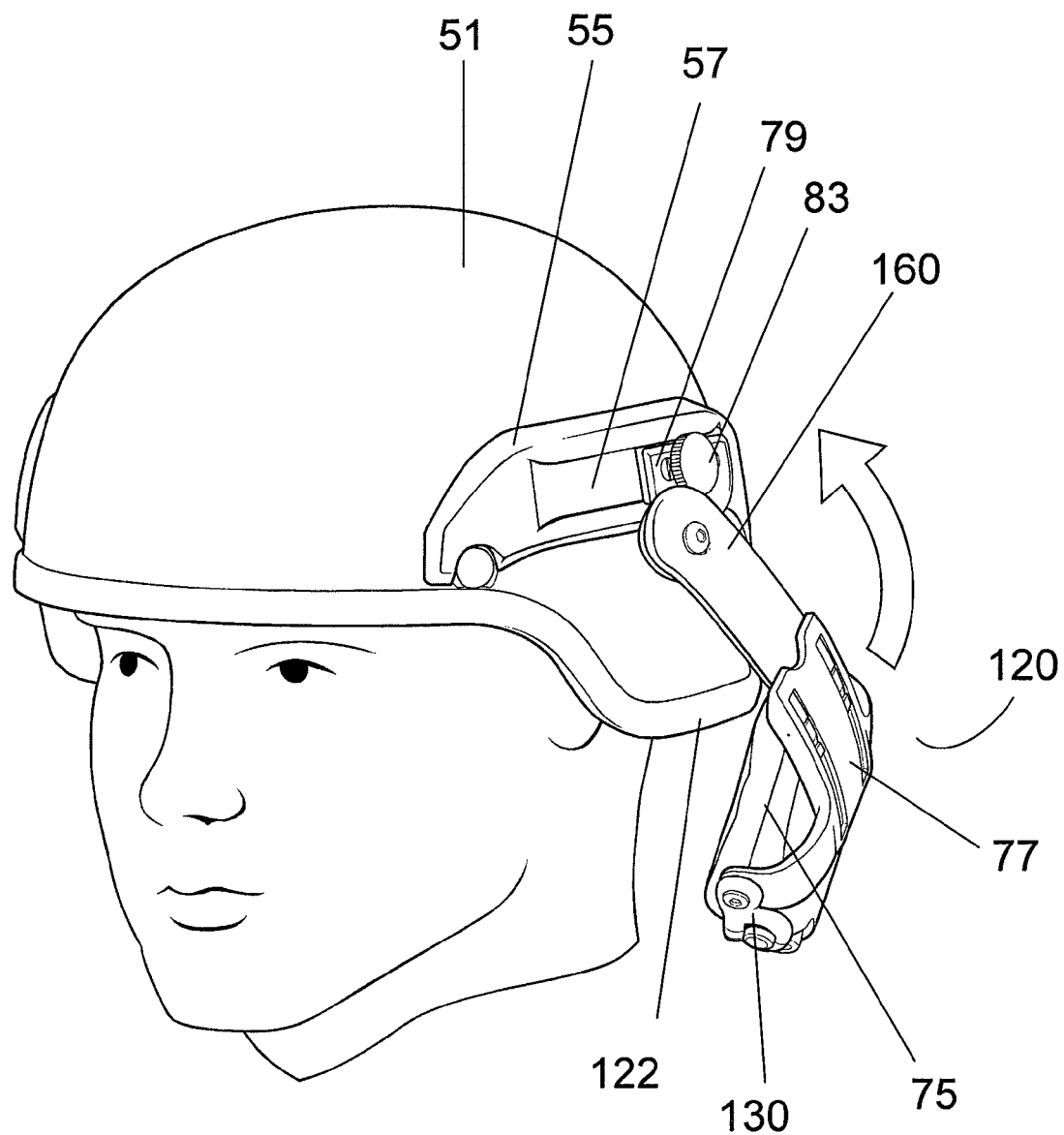
FIG. 8D shows the manner in which the earphone may be rotated into the stowage position.

As shown in FIG. 8C, rotating the earphone around its attachment post facilitates further clearance from the wearer's head. From this position, the wearer can move the hinge mechanism 120 to a stowage position described below, along the trajectory shown in FIG. 8D, or can completely remove the hinge mechanism 120 by loosening thumbscrew 83 and sliding engagement member 79 out of the recessed groove 57 of mounting rail 55.

Figure 9:
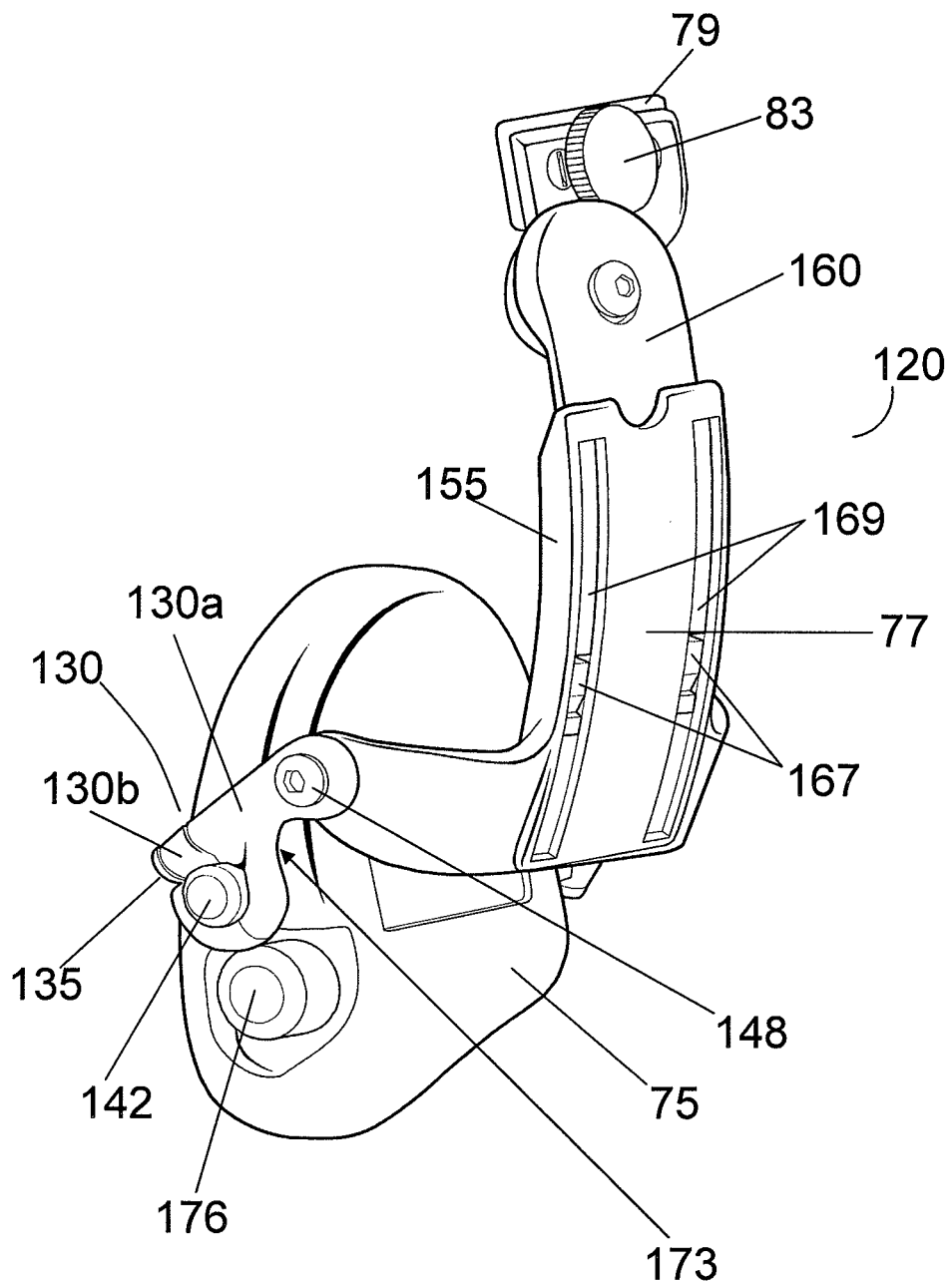
FIG. 9 shows a hinge mechanism in accordance with the present invention with an earphone attached.

The various components of the hinge mechanism 120 are shown in FIG. 9. Pivot arm 130 includes a yoke 130a and a split-ring cap 130b. A split-ring screw 135 (see FIG. 11) holds the components 130a, 130b together, and with the two components joined, the pivot arm 130 rotatably engages a post 142 extending from the earphone 75. A shoulder screw 148 secures the yoke 130a to the connecting member 77 and is dimensioned so that when fully tightened against shoulder nut 153 (see FIG. 12A), it does not pinch too tightly, leaving clearance for the yoke 130a to rotate relative to the connecting member 77. The body of connecting member 77 and the edges 155 thereof form a C-shaped channel into which the shoulder member 160 is slidably received. A pair of tabs 167 formed on shoulder member 160 slide into complementary slots 169 through connecting member 77. The tabs 167 are flexibly joined to shoulder member 160 so that they can be deflected under manual pressure. To releasably engage the shoulder member 160 to the connecting member 77, the tabs 167 deflect as they enter slots 169 and then snap into place. The slidable connection between the connecting member 77 and shoulder member 160 provides adjustment of the earphones 75 in height and may be freely sliding, or maintained by a friction fit, or preferably provided with multiple positions by forming small indentations along the body of connecting member 77 near the slots 169 with resilient indexing features (e.g., as described below in connection with FIG. 14) formed on the body of shoulder member 160 (not shown), such that they "click" from one indentation to the next. To adjust for a comfortable position of the earphones 75 over the wearer's ears, the wearer manually slides connecting member 77 up or down relative to shoulder member 160 to adapt to different head shapes and ear heights. Yoke 130a is preferably curved (as indicated at 173) so that when the earphone 75 is positioned over the wearer's ear, the microphone 176 is not blocked.

Figure 10:
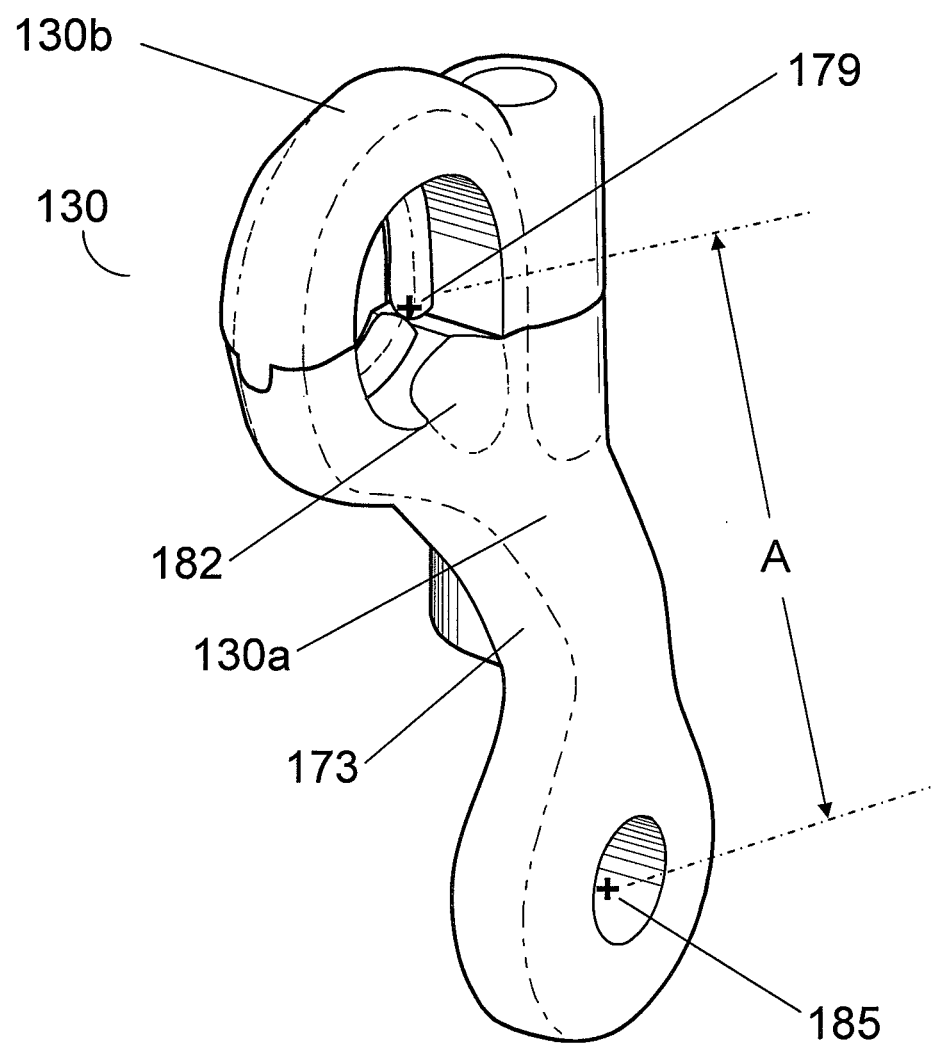
FIG. 10 illustrates the pivot arm of the hinge mechanism separated from other parts.

With reference to FIG. 10, the pivot arm 130 of the hinge mechanism is shown separated from other components. Yoke 130a is shown mated with split-ring cap 130b, forming a split-ring hole 179. This hole 179 may have an internal ring or ridged structure and is sized to receive the post 142 of a standard earphone 75 (see FIG. 9). The yoke 130a has an indentation 182 suitably cut into the split-ring area to provide clearance for an earphone electrical cable exiting the earphone 75 near the post 142 (as described below in connection with FIG. 13). An arm hole 185 is located at the other end of yoke 130a to receive shoulder screw 148, which rotatably attaches the pivot arm 130 to the connecting member 77 (as best seen in FIG. 9). The distance between the center of split-ring hole 179 and the center of arm hole 185 is indicated by dimension A. Preferably, dimension A ranges from 0.5 inch and 2 inches (e.g., 1.25 inches) in order for the mechanism to be easily operated by the helmet's wearer.

Figure 11:
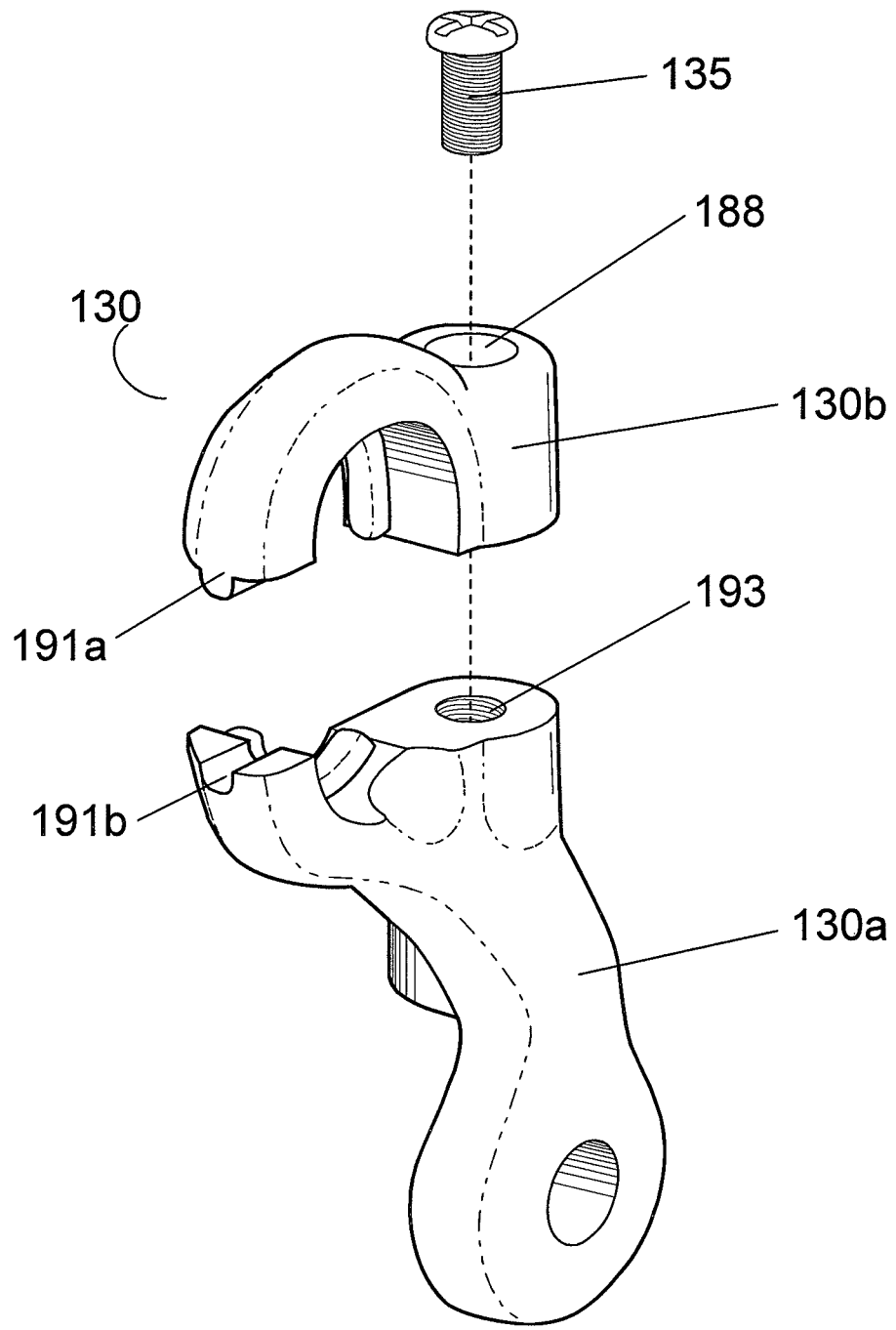
FIG. 11 is an exploded view of the hinge mechanism illustrated in FIG. 10.

With reference to FIG. 11, a counter-sunk hole 188 has a through-hole diameter sized so that the shaft of split-ring screw 135 passes through, and may also have a larger-diameter recess to allow the head of split-ring screw 135 to rest below the surface of split-ring cap 130b to avoid protrusions. A keyed feature 191a and a complementary groove feature 191b are formed in pivot arm components 130a, 130b, respectively, to index the two components one to another. When split-ring screw 135 is inserted into countersunk hole 188 and screwed into the threaded hole 193, the components 130a, 130b are drawn together with key feature 191a received within the groove feature 191b. Removing the split-ring screw 135 and separating the pivot arm into two parts 130a, 130b allows these components to be placed around the post 142 of standard earphones 75 (see FIG. 9), and secured by reinserting and tightening split ring screw 135.

Figure 12A:
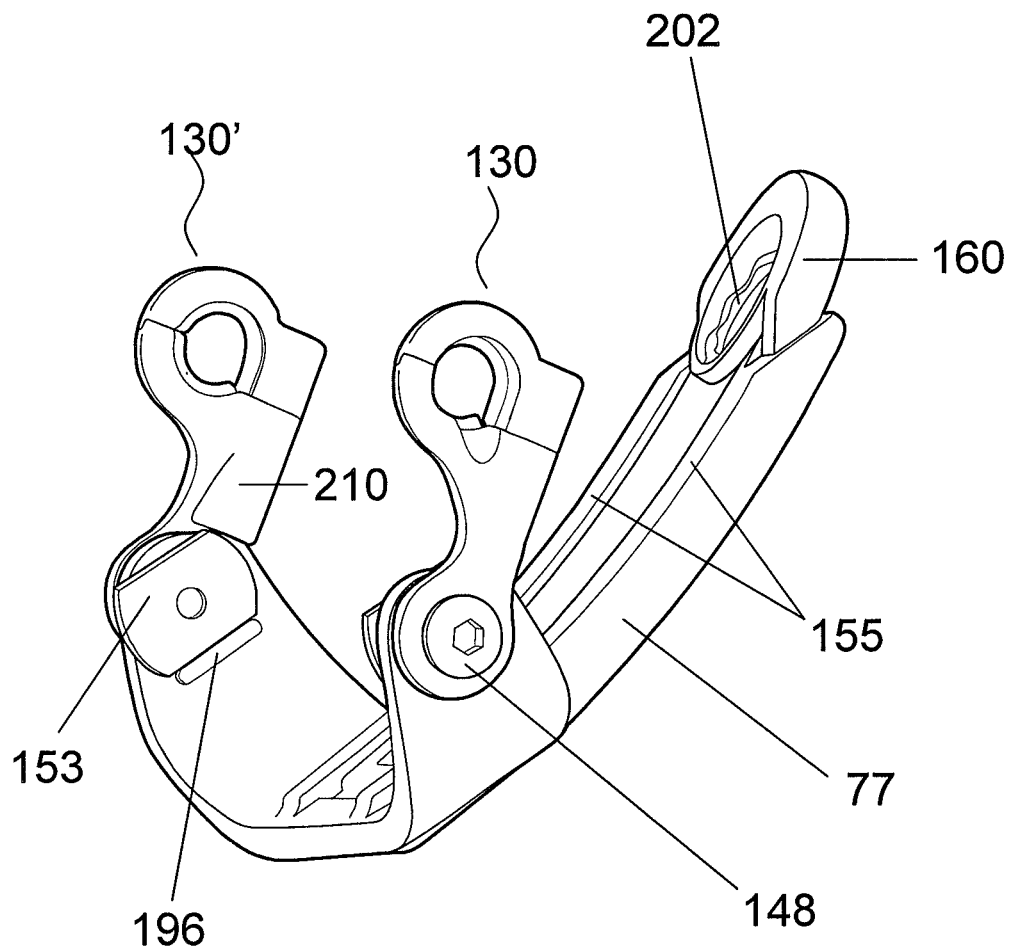
FIG. 12A shows selected components of a hinge mechanism in order to illustrate the interaction among components.

FIG. 12A shows pivot arm 130 and a mirrored symmetrical version of this part 130' connected to a connecting member 77 with a shoulder screw 148 and a shoulder nut 153. Shoulder nut 153 is desirably a "T-nut" with a low profile to avoid interference with the earphone 75 (not shown). To facilitate tightening the shoulder screw 148, connecting member 77 has a blocking feature 196 that keeps shoulder nut 153 from rotating. Shoulder member 160 is shown assembled together with connecting member 77, with the body of shoulder member 160 retained in the channels formed by edges 155. Shoulder member 160 is designed to rotate about an axis passing through a detent ring 202, which is formed with protruding features. A wave washer (not shown) is used to force the protruding features of detent ring 202 in contact with similar or complementary features so that rotational movement of shoulder member 160 occurs in approximately 15° increments.

Further illustrated in FIG. 12A (with alternate embodiments shown in FIGS. 12B and 12C) is a stop feature 210 that mechanically interferes with connecting member 77 to stop rotation of the pivot arm 130 (or 130') relative to the connecting member 77. The degree of allowed rotation can be critical to the amount of pressure holding the earphones 75 (see FIG. 8A) against the wearer's head. Without the stop feature 210, the pivot arm 130, 130' would be able to continue rotation toward connecting member 77, thereby allowing the earphone 75 to fall away from the wearer's head. The stop feature 210 prevents rotation beyond the point illustrated in FIG. 12A.

Figure 12B:
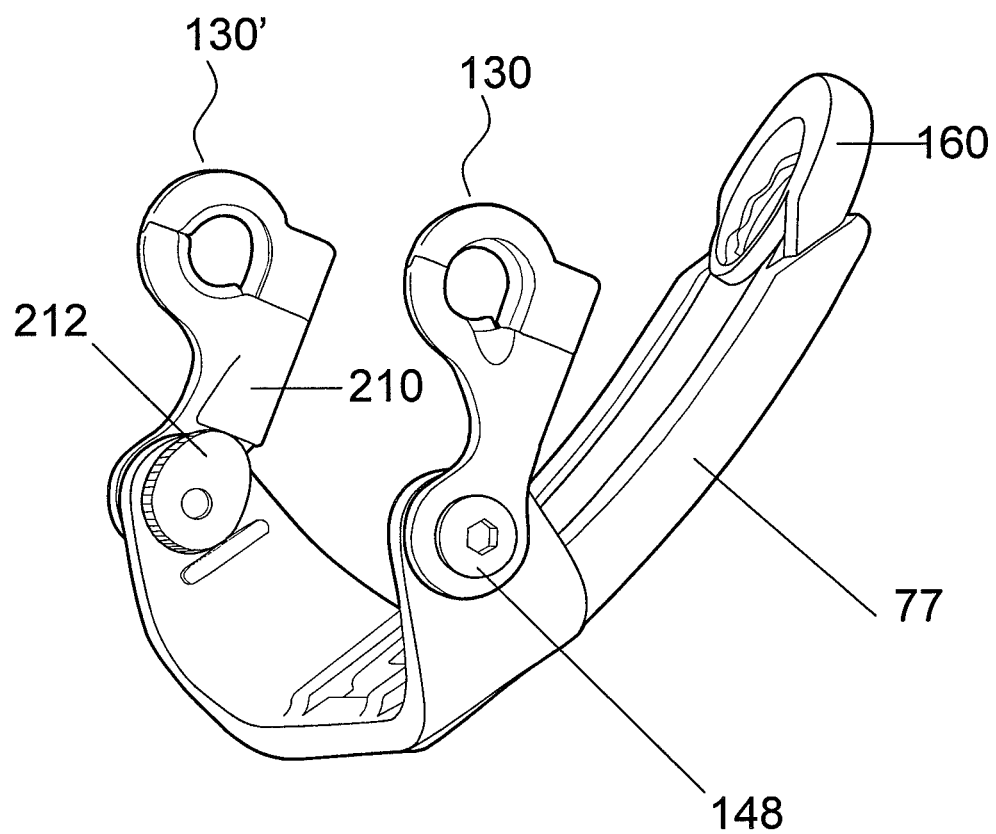
FIG. 12B shows selected components of a hinge mechanism in order to illustrate interference between components of the hinge mechanism.

The alternate embodiment shown in FIG. 12B allows for adjustment of the rotational interference of pivot arm 130 relative to connecting member 77. Adjustment of this rotation may be desirable to accommodate for tolerance of the fabricated parts, differences in helmet sizes, and differing fixation positions of the engagement member 79 onto the helmet 51, or simply to accommodate personal preference. In FIG. 12B, shoulder screws 148 are tightened into a cam nut 212 (instead of the shoulder nut 153). Cam nut 212 may be rotated by the user and held in place while tightening shoulder screw 148 to cause more or less interference with stop feature 210.

Figure 12C:
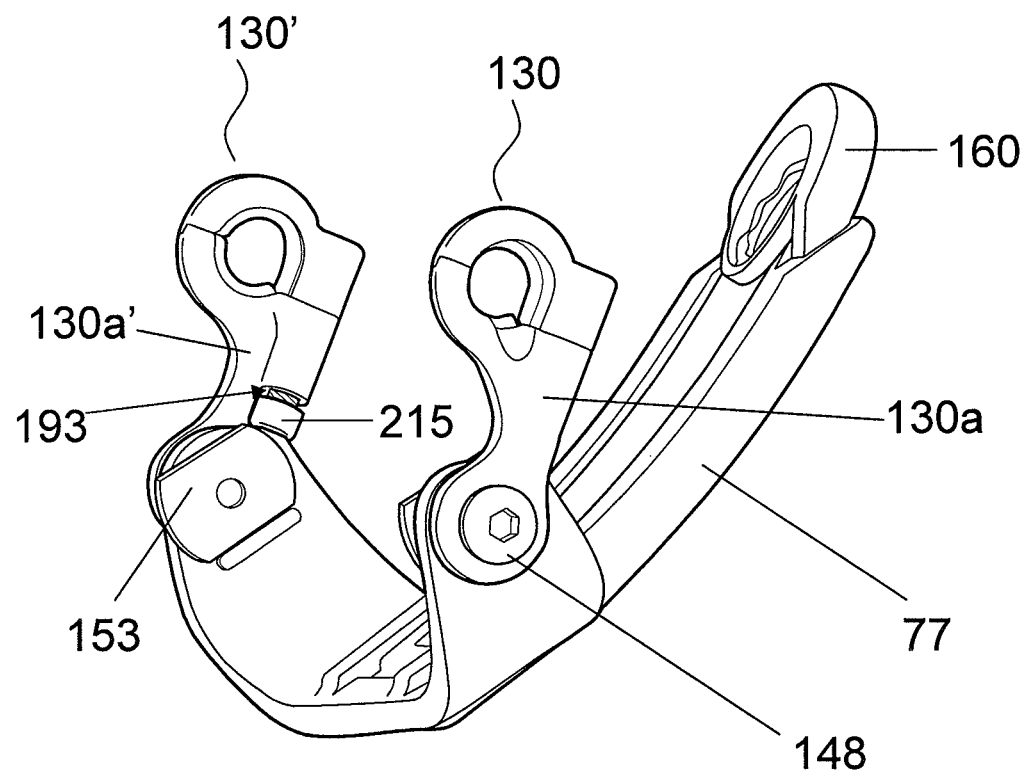
FIG. 12C illustrates an alternate embodiment of the adjusting mechanism.

In the further alternative illustrated in FIG. 12C, the shoulder screw 148 is secured with shoulder nut 153 as previously shown in FIG. 12A. An adjusting screw 215 threads into threaded hole 193 of yoke 130a (or 130a'). Turning adjusting screw 215 varies the amount of interference between pivot arm 130 (or 130') and connecting member 77, thereby adjusting the amount of rotation.

Figure 13:
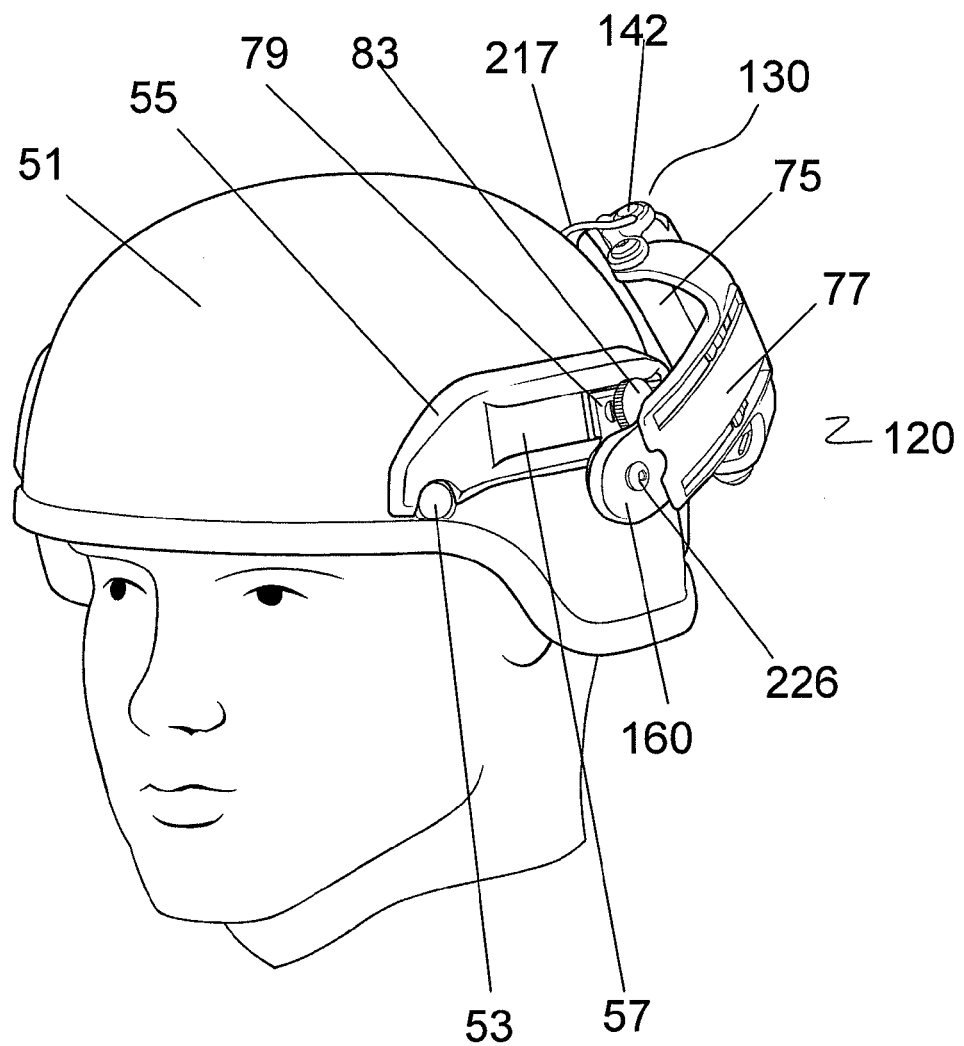
FIG. 13 shows a hinge mechanism assembled with an earphone and attached to a helmet, illustrating the alternate positioning of the assembly at the back of the helmet.

FIG. 13 shows the hinge mechanism of the present invention mounted on a helmet 51 and rotated to the stowage position. Also visible in FIG. 13 is earphone electrical cable 217, which exits from the back side of the earphone 75 where pivot arm 130' clamps around earphone post 142. The hinge mechanism 120 is secured to the helmet by engagement member 79, which is held in recessed groove 57 of mounting rail 55 and secured with thumbscrew 83. A compression screw 226 holds shoulder member 160 to the engagement member 79. The compression screw 226, together with a wave washer and compression nut (not shown), places shoulder member 160 and its detent ring 202 (see FIG. 12A) in compression so that the shoulder member will retain its position (i.e., resist rotation once positioned by the wearer). To move the hinge mechanism from the position of FIG. 8A to that shown in FIG. 13, the wearer (i) pulls downward on the earphone 75, causing pivot arm 130 to rotate downward to the position shown in FIG. 8C; (ii) pulls further to cause the connecting member 77 to slide downward relative to the shoulder member 160; (iii) rotates shoulder member 160 toward the back of the helmet until the earphones 75 are against the back of the helmet shell 51; and (iv) slides connecting member 77 toward the front of the helmet so that the earphone 75 does not cross the mid-line of the helmet, thereby providing room for the corresponding earphone on the other side of the helmet to have a similar stowage position on its side of the back.

Figure 14:
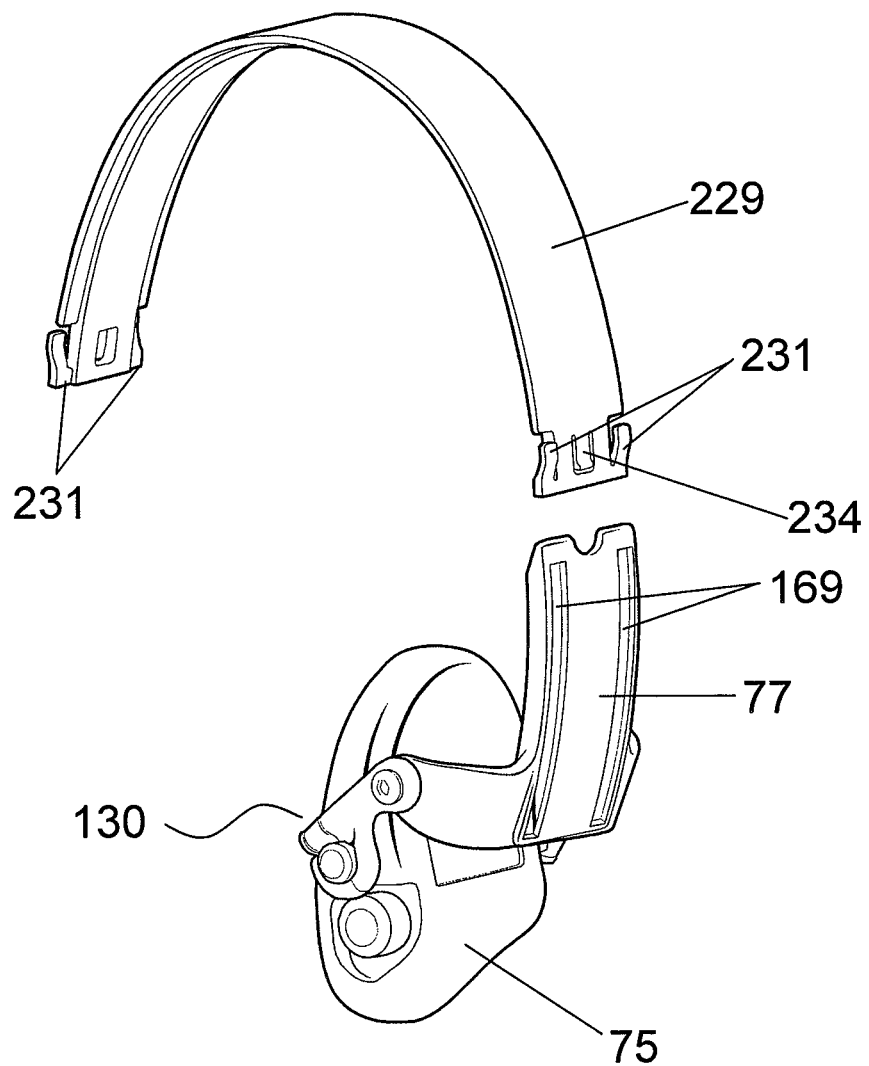
FIG. 14 shows the pivot arm and connecting members of the hinge mechanism assembled with an earphone and separated from the helmet, positioned to be assembled with a conventional headband for use without the helmet.

FIG. 14 shows pivot arm 130 and connecting member 77 detached from the helmet and positioned to be slidably joined to a headband 229, facilitating use of the supported earphones 75 without a helmet. The headband 229 has a pair of tabs 231 with the same dimensions and functions as tabs 167 on the shoulder member 160 (see FIG. 9). The tabs 231 can be momentarily depressed to insert the headband 229 into the channel of connecting member 77 such that the tabs 231 slide in the slots 169. Indexing feature 234 "clicks" against small indentations formed along the body of connecting member 77 near the slots 169 to provide multiple adjustment positions to accommodate the size of the wearer's head.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

The invention claimed is:

1. An ear accessory retention system for a helmet comprising:
   a mounting rail configured to attach to an outer surface of a helmet, the mounting rail including a plurality of holes configured to align with existing through-holes in the helmet for facilitating common affixation of the mounting rail and retention straps to the helmet; and
   a hinge mechanism having a first end and a second end, the first end releaseably coupled to the mounting rail, the second end configured to couple to an ear accessory,
   wherein the hinge mechanism and the mounting rail are configured to position and retain the ear accessory over a user's ear in a use position, and the hinge mechanism and the mounting rail are configured to position and retain the ear accessory proximate a back of the helmet in a stowage position.

2. The ear accessory retention system of claim 1 further comprising:
   an ear accessory coupled to the second end of the hinge mechanism.

3. The ear accessory retention system of claim 2, wherein the ear accessory is configured to extend at least partially past a terminal edge of the helmet and into a head cavity of the helmet in the use position.

4. The ear accessory retention system of claim 2, wherein the ear accessory includes an ear cup.

5. The ear accessory retention system of claim 2, wherein the ear accessory includes an earphone.

6. The ear accessory retention system of claim 1, wherein the mounting rail includes a retaining groove that slideably couples with the first end of the hinge mechanism.

7. The ear accessory retention system of claim 6, wherein the retaining groove has a flat inner surface and a pair of angled side walls opposed to the inner surface.

8. The ear accessory retention system of claim 7, wherein the mounting rail has a curved surface configured to face the outer surface of the helmet when the mounting rail is attached to the outer surface of the helmet.

9. The ear accessory retention system of claim 6, wherein the retaining groove has a dove-tail shape.

10. The ear accessory retention system of claim 1, wherein the mounting rail includes a plurality of apertures each configured to align with a retention strap aperture of the helmet.

11. The ear accessory retention system of claim 1, wherein the hinge mechanism is coupleable to a plurality of locations along the mounting rail.

12. The ear accessory retention system of claim 1, wherein the hinge mechanism includes a pivot mount proximate the second end, the pivot mount configured to allow the ear accessory to pivot relative to the hinge mechanism.

13. The ear accessory retention system of claim 1, wherein a length of the hinge mechanism is adjustable.

14. An ear accessory retention system for a helmet comprising:
   an ear accessory;
   a hinge mechanism having a first end and a second end, the second end coupled to the ear accessory; and
   a dovetail shaped attaching component configured to releaseably couple to a correspondingly shaped groove in a mounting rail mounted to an outer surface of a helmet, the dovetail shaped attaching component configured to slide within the groove between a plurality of mounting locations.

15. The ear accessory retention system of claim 14, wherein the hinge mechanism is configured to position and retain the ear accessory over a user's ear in a use position, and the hinge mechanism is configured to position and retain the ear accessory proximate a back of the helmet in a stowage position.

16. The ear accessory retention system of claim 14, wherein the ear accessory includes an ear cup.

17. The ear accessory retention system of claim 14, wherein the ear accessory includes an earphone.

18. The ear accessory retention system of claim 14, wherein the second end of the hinge mechanism includes a pivot mount configured to allow the ear accessory to pivot relative to the hinge mechanism.

19. The ear accessory retention system of claim 14, wherein a length of the hinge mechanism is adjustable.

20. The ear accessory retention system of claim 14, wherein the dovetail shaped attaching component includes a fastener configured to selectively retain the dovetail attaching component in the groove at each of the plurality of mounting locations.

21. The ear accessory retention system of claim 14, wherein the plurality of mounting locations include any location along a length of the groove.

22. The ear accessory retention system of claim 14, wherein the dovetail shaped attaching component is rotatably attached to the first end.

* * * * *